(12) United States Patent
Berckmans et al.

(10) Patent No.: US 8,076,473 B2
(45) Date of Patent: Dec. 13, 2011

(54) PROCESS FOR STARCH MODIFICATION

(75) Inventors: Marc Charles Florent Berckmans, Brussels (BE); Dogan Sahin Sivasligil, The Hague (NL)

(73) Assignee: Cargill, Incorporated, Wayzata, MN (US)

( * ) Notice: Subject to any disclaimer, the term of this patent is extended or adjusted under 35 U.S.C. 154(b) by 507 days.

(21) Appl. No.: 12/158,976

(22) PCT Filed: Dec. 21, 2006

(86) PCT No.: PCT/EP2006/070115
§ 371 (c)(1),
(2), (4) Date: Jun. 23, 2008

(87) PCT Pub. No.: WO2007/071776
PCT Pub. Date: Jun. 28, 2007

(65) Prior Publication Data
US 2008/0300400 A1 Dec. 4, 2008

(30) Foreign Application Priority Data
Dec. 22, 2005 (EP) .................................... 05257997

(51) Int. Cl.
*C08B 35/08* (2006.01)
*C08B 33/08* (2006.01)
*C08B 31/18* (2006.01)

(52) U.S. Cl. ........................................ 536/105; 536/111

(58) Field of Classification Search ........................ None
See application file for complete search history.

(56) References Cited

U.S. PATENT DOCUMENTS

| 4,373,099 | A | * | 2/1983 | Hubbard et al. | 536/105 |
|---|---|---|---|---|---|
| 5,192,576 | A | * | 3/1993 | Chang et al. | 426/578 |
| 6,482,267 | B1 | | 11/2002 | Fuertes et al. | |
| 6,531,592 | B1 | | 3/2003 | Fuertes et al. | |
| 2005/0229925 | A1 | * | 10/2005 | Ketola | 127/71 |

FOREIGN PATENT DOCUMENTS

| EP | 0 041 316 | | 2/1985 |
|---|---|---|---|
| EP | 0620315 | * | 4/1994 |
| EP | 0 710 670 | | 6/2000 |
| EP | 0 902 037 | | 7/2003 |
| WO | WO2004/091557 | * | 10/2004 |

OTHER PUBLICATIONS

Thomas and Atwell, Starches, Eagan Press Handbook Series, 1999, American Association of Cereal Chemists, St. Paul, Minnesota, pp. 25-30.

* cited by examiner

*Primary Examiner* — Eric S Olson

(57) ABSTRACT

A starch thinning and etherification process is provided comprising the steps of (a) mixing a starch substrate with a thinning agent, an alkalizing agent and an etherification agent; (b) drying the mixture of step (a); and (c) allowing the dried mixture to react with the etherification agent, wherein: the thinning agent consists of one or more hypochlorites; step (a) is carried out at an alkaline pH and does not involve any artificial heating; and step (b) is carried out before the mixture of step (a) reaches the starch substrate's gelatinisation temperature.

15 Claims, 2 Drawing Sheets

PROCESS FOR STARCH MODIFICATION

CROSS-REFERENCE TO RELATED APPLICATIONS

This application is a National Stage application under 35 U.S.C. §371 and claims benefit under 35 U.S.C. §119(a) of International Application No. PCT/EP2006/070115 having an International Filing Date of Dec. 21, 2006, which claims the benefit of priority of EP 05257997.6 having a filing date of Dec. 22, 2005.

FIELD OF THE INVENTION

The present invention relates to a process for the modification of starch. More particularly, it relates to an improved process for starch thinning and etherification and to starches obtained by such a process.

BACKGROUND OF THE INVENTION

Starch is a very commonly used material in a number of technical and industrial applications including, for example, in the production of building materials, the manufacture of paper, the treatment of textiles, the preparation of adhesives and the formulation of products such as detergent tablets or pharmaceuticals. They are also used in a variety of food applications as thickeners, binders, emulsifying agents and gelling agents, for instance.

Starch is a pseudo-crystalline material consisting of two polymers of alpha-D-glucose: amylose and amylopectin. Amylose is essentially a linear polymer in which glucose molecules are bound through alpha 1-4 bonds while amylopectin is a branched polymer containing both alpha 1-4 and 1-6 linkages.

Depending on its required use and functionality, the nature and structure of the starch molecule may have to be modified. This can be achieved by a number of techniques including thermal, chemical and enzymatic treatment.

In most applications, starch is used in the form of a gelatinised paste. Depending on the modifications performed, and on the desired end use, the starch paste will have a higher or lower viscosity. Increasing the stability of these products, and in particular of their viscosity, has been an important objective for starch producers for some time.

Viscosity stability can be improved in a number of ways including, for instance, esterification (e.g. acetylation) and etherification (e.g. hydroxypropylation or cationisation). These modifications can be carried out in the wet phase (where water is used as a vehicle for the reactants) or in the dry phase (characterised by the absence of a solvent medium).

One example of a wet process is the cationisation reaction carried out by contacting an alkaline starch slurry with a cationic agent in the presence of a gelatinization inhibitor at a temperature below the gelatinization temperature of the starch. The reaction times for such a process are characteristically between 12 and 20 hours. To obtain a starch which is also thinned—as required for certain applications—additional operations, such as acid-modification or oxidation, would have to be included in the process. The addition of such operations, however, further complicates the process and results in even greater reaction times. In any event, the reaction slurry will have to have a pH which is adjusted to a more or less neutral value and, after the reaction has been completed, it must be washed to remove salts which are used to inhibit gelatinization.

A key limitation of this wet technology is the amount of water that is wasted and the costs associated with its treatment before disposal, together with the difficulty of increasing the substitution level of starch without concurrent gelatinization.

A number of dry processes have therefore been proposed. For instance, EP0710670 (Vomm Impianti e Processi S.r.L.) describes a continuous chemical modification process by which a starch powder and a modification agent, for example a hydrolytic agent or an alkylation agent, are introduced simultaneously into a thermostatically controlled turbo-reactor comprising a propeller rotating at 300-1500 revolutions per minute. This device enables, almost instantaneously, the creation of a fluid, fine, dynamic and highly turbulent layer of a close mix between the starch particles and the chemical agent.

With such a device, the chemical modification of starch can be carried out in much shorter times. For instance, Example 1 of the patent describes the hydrolysis at 50° C. of a maize starch by hydrochloric acid wherein the retention time of the starch in the reactor is only about 30 seconds. Unfortunately, this process requires the use of a specific device which, in addition to its high energy requirements, naturally increases production costs.

To overcome these drawbacks, EP0902037 (Roquette Freres) proposes a process for thinning starch under acidic conditions. The process is continuous with a reaction time of at least 5 minutes at 60 to 100° C. The patent also discloses a method for the dry modification of starch but this involves adding a chemical modification step to the thinning process.

Thus, although it is easier to obtain thinned starch with this process than by using a specific turbo-reactor, the processing time is longer and productivity is therefore reduced. In addition, a costly heating step is necessary to bring the temperature to the required 60-100° C.

A further drawback of the process described in this patent is that, in order to produce a cationic thinned starch, multiple manipulations of the starch product are necessary (i.e. separate thinning and cationisation steps).

It is therefore apparent that an improved process for the manufacture of thinned, etherified starch is desired. It is an object of the present invention to provide such a method.

STATEMENTS OF THE INVENTION

In a first aspect of the present invention, there is provided a starch thinning and etherification process comprising the steps of:
(a) mixing a starch substrate with a thinning agent, an alkalizing agent and an etherification agent;
(b) drying the mixture of step (a); and
(c) allowing the dried mixture to react with the etherification agent,
wherein:
  the thinning agent consists of one or more hypochlorites;
  step (a) is carried out at an alkaline pH and does not involve any artificial heating; and
  step (b) is carried out before the mixture of step (a) reaches the starch substrate's gelatinisation temperature.

In a second aspect of the present invention, there is provided an etherified thinned starch obtainable by the above process.

In a third aspect of the present invention, there is provided thinned carboxy methyl starches, cationic thinned starch ethers and cationic carboxy methyl starches obtainable by the above process.

DETAILED DESCRIPTION OF THE INVENTION

Figure 1:
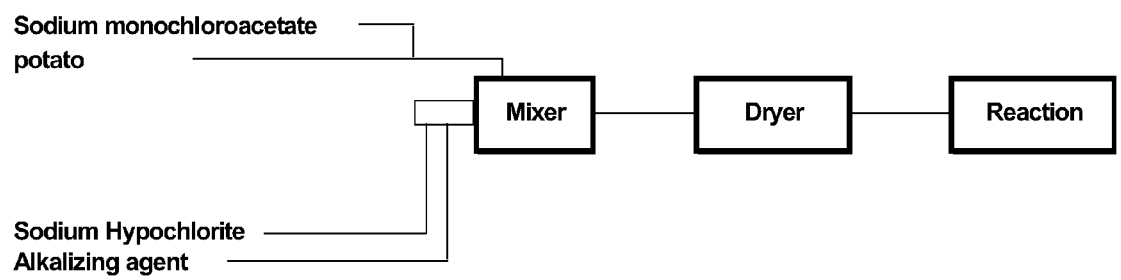
FIG. 1 is a flow chart of the process according to the invention.

All the percentages herein are percentages by dry weight unless stated to the contrary.

The present invention relates to a starch thinning and etherification process comprising the steps of:

(a) mixing a starch substrate with a thinning agent, an alkalizing agent and an etherification agent;

(b) drying the mixture of step (a); and (c) allowing the dried mixture to react with the etherification agent.

This process can be used in the manufacture of all types of thinned starch ethers. Preferably, it will be used for the production of carboxy methyl thinned starch, cationic thinned starch ethers or cationic carboxy methyl thinned starch.

One advantage of the process is that step (a) does not require any artificial heating. The expression "artificial heating" refers to any heating step requiring an external provision of energy, e.g. a steam or electrically heated reactor, microwave heating, etc. Indeed, step (a) can be performed in any type of mixer known in the art capable of producing a homogeneous blend of reagents. Preferably, step (a) will be performed in a straightforward ploughshare type blender such as those marketed under the "LOEDIGE" brand.

It has indeed surprisingly been found that mixing the thinning agent with starch causes an exothermic reaction which generates enough heat to carry out the starch thinning process and to start the etherification reaction. In fact, the reaction is so efficient that a matter of minutes is sufficient to complete the thinning process. Heating must then be stopped to prevent gelatinization of the starch so that it can handled and transported more easily.

Due to the fact that starch is a natural heterogeneous material, the temperature of gelatinization is different depending on the specific botanical source of the starch substrate being used.

The starch substrate of the present invention can be selected from any native or modified starches. Preferably, it will be selected from wheat starch, potato starch, waxy potato starch, maize starch, waxy maize starch, high amylose maize starch, tapioca starch and mixtures of two or more thereof. A modified starch is a starch whose structure has been altered by chemical, enzymatic or heat treatment. For instance, the starch substrate may be selected from esterified, etherified, cross-linked, oxidised or acid modified starches or mixtures of two or more thereof. In one preferred embodiment, the starch substrate will be a cationic starch as this will facilitate the production of cationic carboxy methyl starches.

In addition to the type of starch being used, gelatinization temperature may also be affected by the moisture content, salt content and pH of the reaction medium.

Explanations of the phenomenon of gelatinization can be found in the literature, for instance in David J. Thomas and William A. Atwell, Starches, Eagan Press Handbook Series, American Association of Cereal Chemists, St. Paul, Minn. (1999), pages 25-30.

By way of example, the following table lists the gelatinization temperatures for a number of common starches:

| Starch source | Gelatinization temperature (° C.) |
| --- | --- |
| Wheat | 52-85 |
| Tapioca | 52-65 |
| Potato | 58-65 |
| Dent Corn | 62-80 |
| Waxy Corn | 63-72 |

Thus, the exothermic reaction must be controlled to prevent the specific gelatinization temperature of the starch substrate being reached. Preferably, the reaction temperature will not be allowed to exceed 60° C.

In order to control reaction temperatures, residence time will be limited. For clarity, "residence time" refers to the time required to carry out mixing step (a) plus any time between the end of that step and the beginning of step (b). Put another way, it begins as soon as the starch substrate is added to the mixer and includes any standing time or time required to transport the starch from the mixer to the dryer.

In addition to gelatinisation, residence time may also be affected by the amount and type of thinning agent being used, the type of starch substrate and the type of mixer. Taking all of these factors into consideration, the appropriate residence time will easily be determined by the skilled person.

By way of illustration, residence times will habitually not be more than 2 hours. In fact, the method of the present invention advantageously allows residence times to be reduced to less than 1 hour. Preferably, residence time will be less than 30 minutes, more preferably less than 15 minutes. According to one embodiment, residence time will be less than 10 minutes, more preferably less than 1 minute, even more preferably less than 30 seconds.

During step (b), water is removed from the reaction medium. Thus, while it is desirable that the mixture of step (a) have a moisture content of up to 35%, this should be reduced by at least 5% during step (b). Preferably, the moisture content will be reduced to 25% or less during step (b). Again, it is hard to define exact parameters as moisture content will depend on the type of starch being used, the desired degree of thinning, etc. Nonetheless, the appropriate moisture content and degree of drying will be apparent to the skilled person.

According to one embodiment, the mixture of step (a) will have a moisture content from 8-35%, preferably from 15-25%, and the dried mixture will have a moisture content from 0-25%, preferably from 2-20%, more preferably from 5-15%—provided that the moisture content is reduced by at least 5% between steps (a) and (b).

Step (b) may be achieved by any standard method and using any equipment known in the art to be suitable for this process. Preferably, step (b) will be achieved with a pneumatic dryer such as a flash dryer, ring dryer or fluid bed dryer. Most preferably, step (b) will be performed in a flash dryer.

The reagents mixed in step (a) include the starch substrate defined above, a thinning agent, an alkalizing agent and an etherification agent.

The thinning agent is selected from one or more suitable hypochlorites such as sodium hypochlorite, calcium hypochlorite and potassium hypochlorite. Preferably, the thinning agent will be sodium hypochlorite.

In addition to their exothermic effect and to their thinning capacities, hypochlorites may also have an oxidizing effect on the starch substrate. Advantageously, this oxidation will lead to the formation of carboxyl and/or carbonyl groups and therefore increase the stability of the thinned starch's viscosity.

The thinning agent will be used in an amount of from 0.05 to 8% and preferably from 0.1 to 5%. The percentages cited are in terms of active chlorine based on the dry weight of starch.

The alkalizing agent may be any chemical available in the art having alkaline properties. Preferably, the alkalizing agent will be selected from sodium or potassium carbonate, sodium hydroxide, potassium hydroxide, calcium hydroxide, an organic base and mixtures of two or more thereof. It may be added in any form, e.g. in solid form or in solution. Preferably, it will be added in the form of a solution, more preferably in the form of a highly concentrated solution. Advantageously, the alkalizing agent will be added in a 25-50% w/w solution.

The quantity of alkalizing agent to be added will depend on the quantity and type of etherifying and thinning agents used. For example, the molar ratio of alkalizing agent to active chlorine will preferably be from 0.01:1 to 100:1, more preferably from 0.05:1 to 50:1, even more preferably from 0.1:1 to 11:1.

In fact, the alkalizing agent should preferably be added in excess (either before or during the reaction). This is to counter the acidifying effect of carboxyl group formation. Indeed, at acidic pHs, hypochlorites are not stable and will decompose giving off chlorine gas. Thus, sufficient alkalizing agent should be added to the reaction medium to maintain an alkaline pH. Preferably, the pH of the reaction medium will be maintained at from 9 to 13 (at 10% solution).

Because of the quantity of agent added, some salts will be released into the reaction medium during thinning and will, on a granular level, help prevent gelatinization of the starch thereby contributing to the production of a desirable product.

The etherification agent may be any compound or mixture of compounds known in the art suitable for the production of etherified starches. Preferably, the etherification agent will be a compound or mixture of compounds suitable for the production of carboxy methyl starches (such as sodium monochloro acetate and/or monochloro acetic acid) or cationic starches ethers (such as 3-chloro-2-hydroxypropyl tri-alkylammonium chloride and/or 3-chloro-2-hydroxypropyl trimethyl ammonium chloride (CHPT)).

Etherification of the starch will start during step (a) of the present process but will be completed—i.e. the desired degree of substitution will be reached—during step (c).

The desired degree of substitution will depend on the end use of the starch product. For instance, the carboxy methyl starches of the present invention will preferably have a degree of substitution of 0.001 to 0.5 (as determined by the titration method of Example 1). The cationic starch ethers of the present invention will preferably have a degree of substitution of 0.001 to 0.3 (as determined by the classical Kjeldahl method).

Advantageously, step (c) does not require any further manipulation of the starch product. Indeed, after step (b)—and thanks to the continuing exothermic etherification reaction, the temperature of the dried product will slowly rise up to about 60° C. (depending, for example, on moisture levels, reagent concentrations, etc.) without any artificial heating. Since the etherification reaction according to the present invention is preferably carried out at temperatures ranging from 25 to 60° C., the starch product may simply be "allowed to react" with the etherification agent until the desired degree of substitution is obtained. Thus, by way of illustration, the dried mixture obtained in step (b) may be bagged and etherification step (c) will occur during storage —either at the producer's end or at the customer's end—and/or during transportation. Alternatively, etherification step (c) may occur in a holding tank, a mixer or any other type of reactor.

It is difficult to clearly define a reaction time for step (c) as a number of factors will have to be taken into account including, for instance, the desired degree of substitution, storage temperature and quantity of etherification agent present in the mix. Indeed, the greater the amount of agent, the faster the reaction will be. By way of example, the product could be stored at 50° C. for 44 h. The actual required reaction time for step (c) will be readily calculated by the skilled person taking all these factors into account.

If necessary, the etherification reaction can be accelerated and storage time reduced by adding a heating step after step (b) and before or during step (c). Such a heating step can be carried out in any equipment suitable for reaching the required temperature. For instance, the dried product could be heated at 140° C. for around 5 minutes or at 80° C. for 1 to 4 hours.

Products obtainable according to the above described process also fall within the scope of the present invention. They will preferably have a level of thinning of up to 45%, more preferably from 8 to 40%, even more preferably from 10 to 30% and most preferably from 10 to 20%.

The level of thinning is here defined as the concentration of starch (dry substance) in water (weight/weight) which, after full gelatinization, gives a Brookfield viscosity comprised between 100 and 1000 mPa·s, preferably between 100 and 600 mPa·s, at temperature above 40° C. when the pH is acid, or at a temperature above 60° C. when the pH is alkaline (see FIG. 3). The higher the concentration satisfying this requirement, the higher the level of thinning.

A viscosity comprised between 100 and 600 mPa·s allows an easy handling of the thinned starch product, for example when it has to be pumped. In order to remain within this viscosity range, un-thinned native starches can generally only be used at very low concentrations, e.g. 3 to 6%. By comparison, thinned starches can be uses at higher concentration of 10 to 40% dry solid.

Thus, an aqueous solution containing up to 40% of a thinned starch according to the present invention, at 30° C. for example, could still be within the viscosity limits mentioned above.

Such starches can be used in the textile industry, paper making industry (wet-end additive; surface sizing), the adhesives industry, pharmaceutical industry and various other industries.

The present invention will now be further defined by reference to the following examples. The invention described and claimed herein is not to be limited in scope by these specific embodiments which are only intended as illustrations of a number of possible aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

EXAMPLES

All the samples have been prepared according to one of the following procedures:

Example 1

At the beginning of the process (t=0), the following materials were introduced in a continuous mixer (LOEDIGE) with the following flow rates:

| | |
|---|---|
| Potato starch (16% moisture) | 73.0 Kg/h |
| Sodium Mono Chloro Acetate (SMCA) | 6.3 Kg/h |
| NaOCl (H$_2$O solution - active Cl$_2$ ~155 g/L) | 3.16 L/h |
| NaOH (50% water solution) | 5.8 Kg/h |

The materials were mixed for 30 seconds. The resulting mixture reached 23-30° C. and was then dried within 7 minutes. The drying phase was conducted in a continuous flash-drier for 15 seconds until a final moisture content of 14% was obtained.

The degree of substitution (DS) was measured by the following method:

2 g (expressed as dry basis) of the sample are stirred for 30' in 40 mL of EtOH (80% water solution). After filtration, the product is washed with 500 mL EtOH (70% water solution) until free from chloride ions (argentometric method). The residue is then burnt at 550° until constant weight. The ashes are then dissolved in H$_2$O and the resulting solution is titrated with HCl using methyl orange as indicator.

Example 1 A

The product was produced according to the procedure of Example 1 and stored at room temperature for a period of 44 hours.

The product characteristics are reported in Table 1

Example 1 B

The product was produced according to the procedure of Example and stored at 50° C. for a period of 44 hours.

The product characteristics are reported in Table 1

Example 1 C

The product was produced according to the procedure of Example and stored at room temperature for a period of 44 hours followed by one hour at 70° C.

The product characteristics are reported in Table 1.

TABLE 1

DS expressed as average number of substituents/glucose unit.

| Sample | Moisture (%) | DS |
|---|---|---|
| 1A | 14 | 0.054 |
| 1B | 14 | 0.068 |
| 1C | 14 | 0.089 |

Example 2

The viscosities of the samples 1A and 1B were measured with the Brookfield viscometer DV-II, using a 10% (w/w) slurry. The slurry was cooked in a boiling water-bath during 30 minutes under stirring conditions (250 rpm). The mixture was then cooled with water at a temperature of less than 30° C. and the viscosity was measured at different temperatures under stirring (100 rpm) and with spindle n.2.

Figure 2:
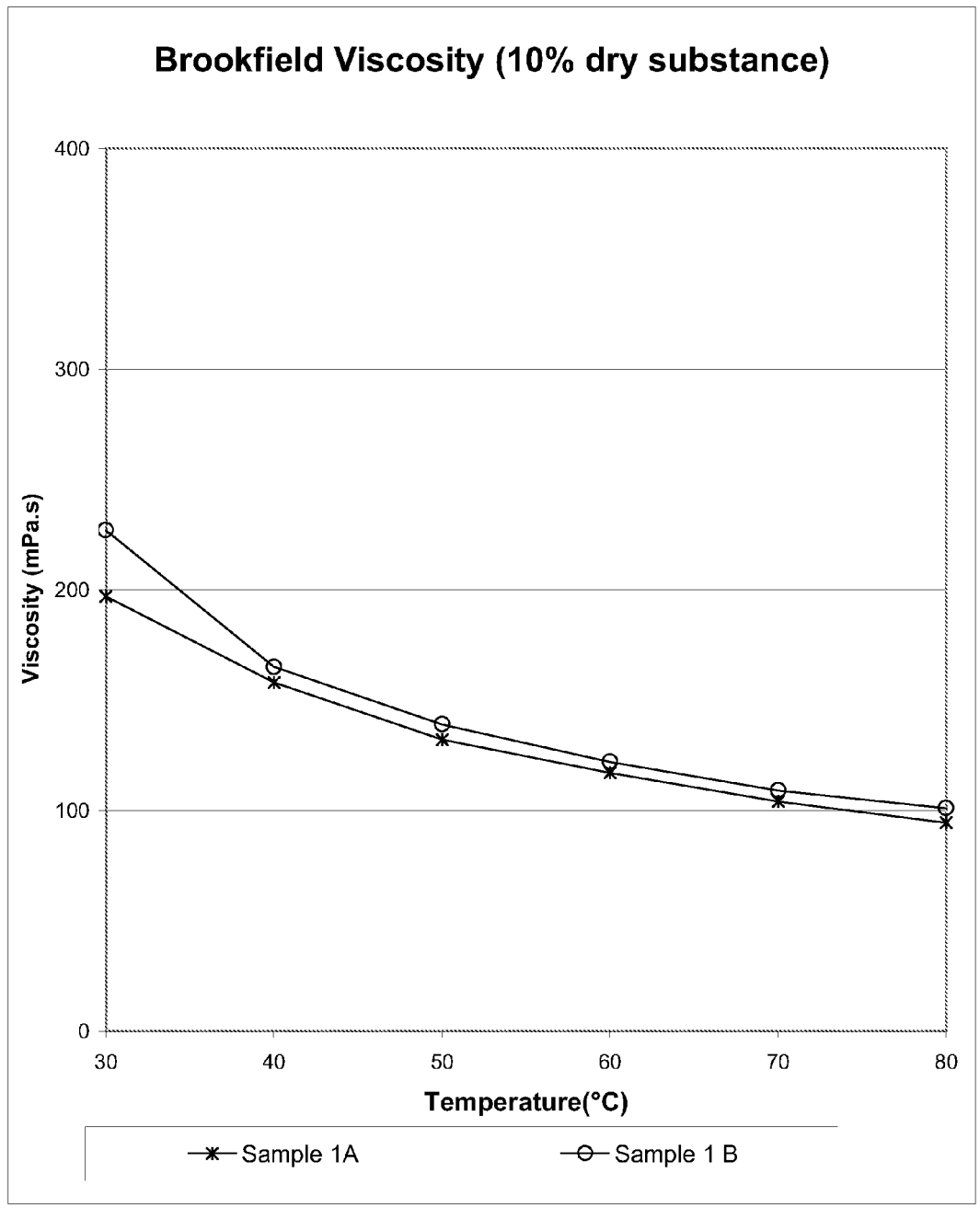
FIG. 2 shows the evolution, in relation to temperature, of the Brookfield viscosity of a thinned carboxy methyl starch (10% dry substance) of the invention.

The results are reported in FIG. 2.

The invention claimed is:

1. A starch thinning and etherification process comprising the steps of:
   (a) mixing a starch substrate with a thinning agent, an alkalizing agent and an etherification agent, wherein the moisture content of the mixture does not exceed 35% by weight;
   (b) drying the mixture of step (a); and
   (c) allowing the dried mixture to react with the etherification agent, wherein:
   the thinning agent consists of one or more hypochlorites;
   step (a) is carried out at an alkaline pH and does not involve any artificial heating; and
   step (b) is carried out before the mixture of step (a) reaches the starch substrate's gelatinisation temperature.

2. The process of claim 1 wherein the one or more hypochlorites are selected from the group consisting of sodium hypochlorite, calcium hypochlorite and potassium hypochlorite.

3. The process of claim 1 wherein the alkalizing agent is selected from the group consisting of: sodium or potassium carbonate, sodium hydroxide, potassium hydroxide, calcium hydroxide and mixtures of two or more thereof.

4. The process of claim 1 wherein the alkalizing agent is in the form of a solution.

5. The process of claim 1 wherein the etherification agent is selected from the group consisting of: sodium monochloro acetate, monochloro acetic acid, 3-chloro-2-hydroxypropyl trialkylammonium chloride, 3-chloro-2-hydroxypropyl trimethyl ammonium chloride and mixtures of two or more thereof.

6. The process of claim 1 wherein the starch substrate is selected from the group consisting of: wheat starch, potato starch, waxy potato starch, maize starch, waxy maize starch, high amylose maize starch, tapioca starch and mixtures of two or more thereof.

7. The process of claim 1 wherein the starch substrate is a cationic starch.

8. The process of claim 1 wherein the moisture content is reduced by at least 5% during step (b).

9. The process of claim 1 wherein the moisture content is reduced to 25% or less during step (b).

10. The process of claim 1 wherein the mixture of step (a) has a pH of 9 to 13.

11. The process of claim 1 wherein step (b) is carried out before the mixture of step (a) reaches a temperature of 60° C.

12. An etherified thinned starch obtainable by the process of claim 1.

13. A thinned carboxy methyl starch, a cationic thinned starch ether or a cationic carboxy methyl starch obtainable by the process of claim 1.

14. The carboxy methyl thinned starch of claim 13 which has a degree of substitution of 0.001 to 0.5.

15. The cationic thinned starch ether of claim 13 which has a degree of substitution of 0.001 to 0.3.

* * * * *